(12) United States Patent
Borgerson et al.

(10) Patent No.: US 8,943,917 B2
(45) Date of Patent: Feb. 3, 2015

(54) MANUAL TRANSMISSION

(75) Inventors: James B. Borgerson, Clarkston, MI (US); Scott H. Wittkopp, Ypsilanti, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 251 days.

(21) Appl. No.: 12/908,503

(22) Filed: Oct. 20, 2010

(65) Prior Publication Data

US 2012/0096966 A1     Apr. 26, 2012

(51) Int. Cl.
F16H 3/08 (2006.01)
F16H 3/089 (2006.01)

(52) U.S. Cl.
CPC ........ F16H 3/089 (2013.01); F16H 2200/0047 (2013.01)
USPC .............................................. 74/325; 74/333

(58) Field of Classification Search
USPC .......................................................... 74/329
See application file for complete search history.

(56) References Cited

U.S. PATENT DOCUMENTS

| | | | | |
|---|---|---|---|---|
| 4,777,837 A | * | 10/1988 | Lehle | 74/360 |
| 5,946,970 A | * | 9/1999 | Fraley et al. | 74/325 |
| 6,886,424 B2 | * | 5/2005 | Janson et al. | 74/329 |
| 7,080,566 B2 | * | 7/2006 | Baldwin et al. | 74/331 |
| 7,115,063 B2 | * | 10/2006 | Tiesler et al. | 475/284 |
| 7,155,993 B2 | * | 1/2007 | Koenig et al. | 74/331 |
| 7,231,845 B2 | * | 6/2007 | Klaricic | 74/349 |
| 7,430,935 B2 | * | 10/2008 | Ohnemus | 74/329 |
| 7,437,963 B2 | * | 10/2008 | Haka et al. | 74/329 |
| 7,743,677 B2 | * | 6/2010 | Borgerson et al. | 74/331 |
| 7,752,934 B2 | * | 7/2010 | Singh et al. | 74/331 |
| 7,832,299 B2 | * | 11/2010 | Kobayashi et al. | 74/330 |
| 2002/0170370 A1 | * | 11/2002 | Gilbert et al. | 74/329 |
| 2003/0024334 A1 | * | 2/2003 | Wafzig | 74/329 |
| 2006/0101932 A1 | * | 5/2006 | McCrary | 74/329 |

FOREIGN PATENT DOCUMENTS

CN    101749378 A    6/2010
DE       907744 C    3/1954

* cited by examiner

*Primary Examiner* — David M Fenstermacher
*Assistant Examiner* — Zakaria Elahmadi

(57) ABSTRACT

A manual transmission includes an input member, an output member, a transmission input shaft, a countershaft, a reverse shaft, a plurality of co-planar gear sets, and a plurality of torque transmitting devices. The torque transmitting devices include a plurality of synchronizer assemblies. The transmission is operable to provide at least one reverse speed ratio and a plurality of forward speed ratios between the input member and the output member.

15 Claims, 1 Drawing Sheet

MANUAL TRANSMISSION

TECHNICAL FIELD

The present disclosure relates to transmissions and more particularly to a compact, manual transmission having three axes to establish five forward gear speeds and one reverse gear speed.

BACKGROUND

The statements in this section merely provide background information related to the present disclosure and may or may not constitute prior art.

Automotive manual transmissions employ synchronizer torque-transmitting mechanisms to establish torque paths from a transmission input shaft to a transmission output shaft. Manual transmissions are generally countershaft-type transmissions wherein one of the first ratio gears is disposed on a main or central shaft and the other first ratio gear that meshes with the first ratio gear is supported on a countershaft parallel with the main shaft. The ratio gears mesh such that a plurality of gear ratios can be established between the input shaft and the output shaft with the power flow passing through the main shaft and countershaft.

Typically, a plurality of synchronizer clutches is employed on one of the shafts to permit connection and disconnection of one of the sets of ratio gears therewith. When the ratio gear is connected with the shaft, the mating gears between the central shaft and the countershaft transmit torque and speed between the shafts and to the output shaft. Each set of ratio gears has a synchronizer clutch which is a device for controlling the on-coming gear ratio to permit synchronization between the gear member and the shaft on which it is rotatably mounted. Engagement of a particular synchronizer is generally controlled by a shift rod that is under control of the operator of the motor vehicle.

While current manual transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a manual transmission having improved packaging while providing desirable gear ratios and torque ranges.

SUMMARY

The present invention provides a manual transmission having a transmission input member, an output member, a countershaft, a reverse shaft, a plurality of co-planar gear sets and a plurality of torque transmitting devices. The torque transmitting devices include a plurality of synchronizer assemblies. The transmission is operable to provide at least one reverse speed ratio and a plurality of forward speed ratios between the input member and the output member. The configuration of the co-planar gear sets provides an ultra-compact manual transmission.

In one aspect of the present invention, the transmission includes seven co-planar gear sets two of which provide a reverse gear.

In yet another aspect of the present invention, the transmission includes three synchronizer assemblies.

In yet another aspect of the present invention, the synchronizer assemblies are two-way or bi-directional synchronizers.

In yet another aspect of the present invention, the transmission is operable to provide at least five forward speed ratios and one reverse speed ratio.

The above features and advantages and other features and advantages of the present invention are readily apparent from the following detailed description of the best modes for carrying out the invention when taken in connection with the accompanying drawings.

DESCRIPTION

Figure 1:
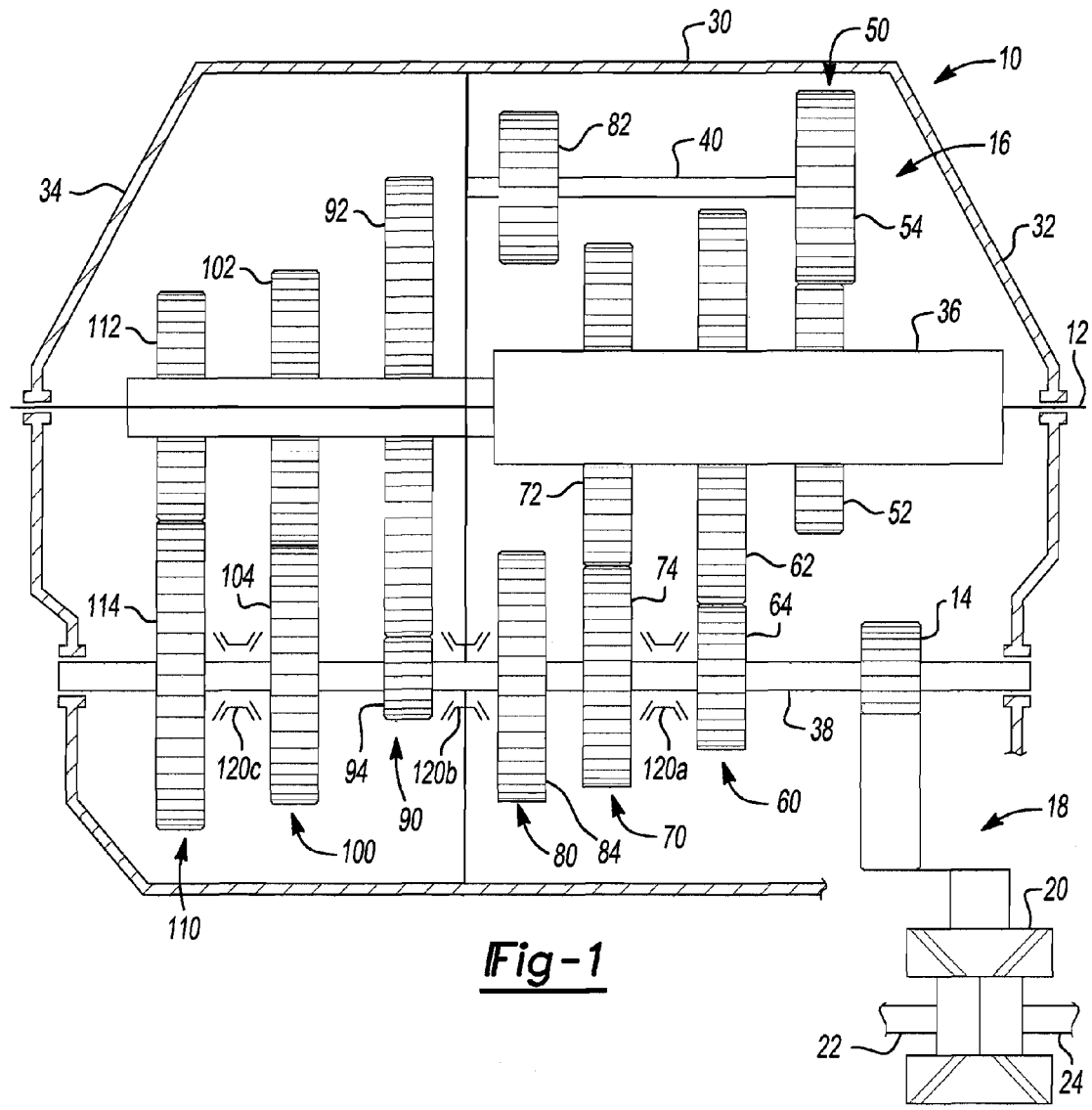
FIG. 1 is a schematic diagram of an embodiment of a five speed manual transmission in accordance with the principles of the present invention.

Referring to FIG. 1, a multiple speed manual transmission is generally indicated by reference number 10. The transmission 10 includes an input member 12, an output member 14, and a gearing arrangement 16. The input member 12 may be separate from the transmission 10 and form part of or be connected with a flywheel or other output from an engine (not shown). The input member 12 is continuously connected with an engine (not shown) or other torque producing machine to provide a driving torque to input member 12. The output member 14 rotatably drives a final drive assembly 18. In the example provided, the output member 14 is a transfer gear coupled to the final drive assembly 18. The final drive assembly 18 includes a differential gear set coupled to and supported in a differential housing 20. The differential housing 20 is coupled to and is rotatably driven by the output member 14. Further, the differential housing 20 transfers torque delivered by the output member 14 to the differential gear set that is rotatably coupled to first and second side axles 22, 24, and on to road wheels (not shown) coupled to the side axles 22, 24.

The gearing arrangement 16 includes various shafts or members, co-planar intermeshing gear sets, and selectively engageable synchronizers, as will be described herein, that are enclosed by a transmission case or housing 30. The housing 30 includes end walls 32 and 34. End wall 32 is located on a front or side of the transmission 10 proximate the input member 12 and end wall 34 is located on an opposite side of the transmission housing 30 than the end wall 32.

The gearing arrangement 16 of transmission 10 includes a transmission input shaft or member 36, a countershaft 38 and a reverse or idler shaft 40. The countershaft 38 and the reverse shaft 40 are each spaced apart from and parallel with the transmission input shaft 36. The transmission input shaft 36 defines a first axis of rotation, the countershaft 38 defines a second axis of rotation and the reverse shaft 40 defines a third axis of rotation.

The gearing arrangement 16 also includes a plurality of co-planar, intermeshing gear sets 50, 60, 70, 80, 90, 100, and 110. Co-planar gear set 50 includes gear 52 and gear 54. Gear 52 is rotatably fixed and connected for common rotation with the transmission input shaft 36 and intermeshes with gear 54. Gear 54 is rotatably fixed and connected for common rotation with the reverse shaft 40. Gear set 50 is disposed adjacent the end wall 32.

Co-planar gear set 60 includes gear 62 and gear 64. Gear 62 is rotatably fixed and connected for common rotation with the transmission input shaft 36 and intermeshes with gear 64.

Gear 64 is selectively connectable for common rotation with the countershaft 38. Gear set 60 is positioned adjacent gear set 50.

Co-planar gear set 70 includes gear 72 and gear 74. Gear 62 is rotatably fixed and connected for common rotation with the transmission input shaft 36 and intermeshes with gear 74. Gear 74 is selectively connectable for common rotation with the countershaft 38. Gear set 70 is disposed adjacent gear set 60.

Co-planar gear set 80 includes gear 82 and gear 84. Gear 82 is rotatably fixed and connected for common rotation with the reverse shaft 40 and intermeshes with gear 84. Gear 84 is selectively connectable for common rotation with the countershaft 38. Gear set 80 is located adjacent gear set 70.

Co-planar gear set 90 includes gear 92 and gear 94. Gear 92 is rotatably fixed and connected for common rotation with the transmission input shaft 36 and intermeshes with gear 94. Gear 94 is selectively connectable for common rotation with the countershaft 38. Gear set 90 is located adjacent gear set 80.

Co-planar gear set 100 includes gear 102 and gear 104. Gear 102 is rotatably fixed and connected for common rotation with the transmission input shaft 36 and intermeshes with gear 104. Gear 104 is selectively connectable for common rotation with the countershaft 38. Gear set 100 is located adjacent gear set 90.

Co-planar gear set 110 includes gear 112 and gear 114. Gear 112 is rotatably fixed and connected for common rotation with the transmission input shaft 36 and intermeshes with gear 114. Gear 114 is selectively connectable for common rotation with the countershaft 38. Gear set 110 is located adjacent gear set 100.

The transmission 10 further includes a plurality of selectively actuatable synchronizer assemblies 120A, 120B, and 120C. Synchronizers 120A, 120B, and 120C are double sided synchronizers and generally include a shift fork (not shown) that is bi-directionally translated by an actuator (not shown) connected through to a shift rod (not shown) into at least two engaged positions and a neutral or disengaged position. In the present embodiment, synchronizer 120A is selectively actuatable to connect for common rotation gear 64 with the countershaft 38 and is selectively actuatable to connect for common rotation gear 74 with the countershaft 38. In the present embodiment, synchronizer 120B is selectively actuatable to connect for common rotation gear 84 with the countershaft 38 and is selectively actuatable to connect for common rotation gear 94 with the countershaft 38. In the present embodiment, synchronizer 120C is selectively actuatable to connect for common rotation gear 104 with the countershaft 38 and is selectively actuatable to connect for common rotation gear 114 with the countershaft 38.

The transmission 10 is capable of transmitting torque from the input shaft 12 to the output member 14 in at least five forward torque ratios and at least one reverse torque ratio. Each of the forward torque ratios and the reverse torque ratio is attained by selective engagement of the synchronizer assemblies 120A-C. Those skilled in the art will readily understand that a different speed ratio is associated with each torque ratio.

It should be appreciated that each individual gear set 60, 70, 80, 90, 100, and 110 provides one or more forward and/or reverse gear ratios upon selective engagement of the synchronizer assemblies 120A-C. For example, to establish a first forward torque ratio (i.e. a 1st gear), synchronizer 120C is activated by moving a shift rod to a first gear position, shown in FIG. 2. Synchronizer 120C couples gear 114 to the countershaft 38. Input torque from the input member 12 is transferred through the transmission input shaft 36 to gear 112. Gear 112 transfers torque to gear 114 which transfers the torque to the countershaft 38 through synchronizer 120C, from the countershaft 38 to output member or gear 14, and from output member or gear 14 to differential housing 20 of final drive assembly 18.

Figure 2:
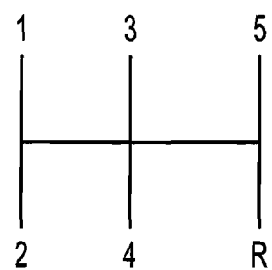
FIG. 2 is a schematic diagram of a shift control layout for the five speed manual transmission.

To establish a second forward torque ratio (i.e. a 2nd gear), synchronizer 120C is activated by moving a shift rod to a second gear position, shown in FIG. 2. Synchronizer 120C couples gear 104 to the countershaft 38. Input torque from the input member 12 is transferred through the transmission input shaft 36 to gear 102. Gear 102 transfers torque to gear 104 which transfers the torque to the countershaft 38 through synchronizer 120C, from the countershaft 38 to output member or gear 14, and from output member or gear 14 to differential housing 20 of final drive assembly 18.

To establish a third forward torque ratio (i.e. a 3rd gear), synchronizer 120A is activated by moving a shift rod to a third gear position, shown in FIG. 2. Synchronizer 120A couples gear 74 to the countershaft 38. Input torque from the input member 12 is transferred through the transmission input shaft 36 to gear 72. Gear 72 transfers torque to gear 74 which transfers the torque to the countershaft 38 through synchronizer 120A, from the countershaft 38 to output member or gear 14, and from output member or gear 14 to differential housing 20 of final drive assembly 18.

To establish a fourth forward torque ratio (i.e. a 4th gear), synchronizer 120A is activated by moving a shift rod to a fourth gear position, shown in FIG. 2. Synchronizer 120A couples gear 64 to the countershaft 38. Input torque from the input member 12 is transferred through the transmission input shaft 36 to gear 62. Gear 62 transfers torque to gear 64 which transfers the torque to the countershaft 38 through synchronizer 120A, from the countershaft 38 to output member or gear 14, and from output member or gear 14 to differential housing 20 of final drive assembly 18.

To establish a fifth forward torque ratio (i.e. a 5th gear), synchronizer 120B is activated by moving a shift rod to a fifth gear position, shown in FIG. 2. Synchronizer 120B couples gear 94 to the countershaft 38. Input torque from the input member 12 is transferred through the transmission input shaft 36 to gear 92. Gear 92 transfers torque to gear 94 which transfers the torque to the countershaft 38 through synchronizer 120B, from the countershaft 38 to output member or gear 14, and from output member or gear 14 to differential housing 20 of final drive assembly 18.

To establish a reverse torque ratio (i.e. a reverse gear), synchronizer 120B is activated by moving a shift rod to a reverse (R) gear position, shown in FIG. 2. Synchronizer 120B couples gear 84 to the countershaft 38. Input torque from the input member 12 is transferred through the transmission input shaft 36 to gear 52. Gear 52 transfers torque to gear 54 and gear 54 transfers torque to gear 82 via the reverse shaft 40. Gear 82 transfers the torque to gear 84 which transfers the torque to the countershaft 38 through synchronizer 120B, from the countershaft 38 to output member or gear 14, and from output member or gear 14 to differential housing 20 of final drive assembly 18.

The present invention contemplates that a variety of torque ratios (i.e., the ratio of torque of the output member 14 to the input member 12) are achievable through the selection of tooth counts of the gears of the transmission 10. This arrangement provides the opportunity to achieve reduced transmission length in comparison with other transmissions.

While the best modes for carrying out the invention have been described in detail, those familiar with the art to which this invention relates will recognize various alternative designs and embodiments for practicing the invention within the scope of the appended claims.

The following is claimed:

1. A manual transmission comprising:
   a transmission housing;
   first, second, third, fourth, and fifth gear sets, wherein the first gear set includes a first gear in mesh with a second gear, the second gear set includes a first gear in mesh with a second gear, the third gear set includes a first gear in mesh with a second gear, the fourth gear set includes a first gear in mesh with a second gear, and the fifth gear set includes a first gear in mesh with a second gear;
   a first reverse gear set including a first reverse gear in mesh with a second reverse gear;
   a second reverse gear set including a first reverse gear in mesh with a second reverse gear;
   a transmission input shaft rotatably supported in the transmission housing and wherein each of the first gear of the first, second, third, fourth, fifth gear, and first reverse sets are rotatably fixed directly to the transmission input shaft;
   a countershaft rotatably supported within the transmission housing and spaced apart from and parallel with the transmission input shaft, wherein each of the second gear of the first, second, third, fourth, fifth, and second reverse gear sets are selectively engageable with the first countershaft;
   a reverse shaft rotatably supported within the transmission housing and spaced apart from and parallel with the transmission input shaft, wherein each of the second gear of the first and the first of the second reverse gear sets are rotatably fixed directly to the reverse shaft; and
   at least three synchronizer assemblies each for selectively coupling at least one of the gears of the first, second, third, fourth, fifth, and second reverse gear sets with the countershaft, and
   wherein the selective engagement of at least one of the three synchronizer assemblies establishes at least one of five forward speed ratios and one reverse speed ratio.

2. The manual transmission of claim 1 wherein the first gear set provides a first forward speed ratio, the second gear set provides a second forward speed ratio, the third gear set provides a third forward speed ratio, the fourth gear set provides a fourth forward speed ratio, the fifth gear set provides a fifth forward speed ratio, and the first and second reverse gear sets provide a reverse speed ratio.

3. The manual transmission of claim 2 wherein the first gear set is adjacent the second gear set, the second gear set is adjacent the fifth gear set, the fifth gear set is adjacent the second reverse gear set, the second reverse gear set is adjacent the third gear set, the third gear set is adjacent the fourth gear set, and the fourth gear set is adjacent the first reverse gear set.

4. The manual transmission of claim 3 wherein a first of the three synchronizer assemblies selectively connects at least one of the second gear of the third gear set and the second gear of the fourth gear set to the countershaft.

5. The manual transmission of claim 4 wherein a second of the three synchronizer assemblies selectively connects at least one of the second gear of the fifth gear set and the second gear of the second reverse gear set to the countershaft.

6. The manual transmission of claim 5 wherein a third of the three synchronizer assemblies selectively connects at least one of the second gear of the first gear set and the second gear of the second gear set to the countershaft.

7. The manual transmission of claim 1 further comprising an output member connected directly to the countershaft.

8. The manual transmission of claim 7 wherein the output member is a transfer gear in mesh with a differential assembly.

9. A manual transmission comprising:
   a transmission housing;
   first, second, third, fourth, and fifth gear sets, wherein the first gear set includes a first gear in mesh with a second gear, the second gear set includes a first gear in mesh with a second gear, the third gear set includes a first gear in mesh with a second gear, the fourth gear set includes a first gear in mesh with a second gear, and the fifth gear set includes a first gear in mesh with a second gear;
   a first reverse gear set including a first reverse gear in mesh with a second reverse gear;
   a second reverse gear set including a first reverse gear in mesh with a second reverse gear;
   a transmission input shaft rotatably supported in the transmission housing and wherein each of the first gear of the first, second, third, fourth, fifth gear, and first reverse sets are rotatably fixed directly to the transmission input shaft;
   a countershaft rotatably supported within the transmission housing and spaced apart from and parallel with the transmission input shaft, wherein each of the second gear of the first, second, third, fourth, fifth, and second reverse gear sets are selectively engageable with the first countershaft;
   a reverse shaft rotatably supported within the transmission housing and spaced apart from and parallel with the transmission input shaft, wherein each of the second gear of the first and the first of the second reverse gear sets are rotatably fixed directly to the reverse shaft;
   a first synchronizer assembly for selectively connecting at least one of the second gear of the third gear set and the second gear of the fourth gear set to the countershaft;
   a second synchronizer assembly for selectively connecting at least one of the second gear of the fifth gear set and the second gear of the second reverse gear set to the countershaft; and
   a third synchronizer assembly for selectively connecting at least one of the second gear of the first gear set and the second gear of the second gear set to the countershaft, and
   wherein the selective engagement of the first, second, and third synchronizer assemblies establishes at least one of five forward speed ratios and one reverse speed ratio.

10. The manual transmission of claim 9 wherein the first gear set provides a first forward speed ratio, the second gear set provides a second forward speed ratio, the third gear set provides a third forward speed ratio, the fourth gear set provides a fourth forward speed ratio, the fifth gear set provides a fifth forward speed ratio, and the first and second reverse gear sets provide a reverse speed ratio.

11. The manual transmission of claim 9 wherein the first gear set is adjacent the second gear set, the second gear set is adjacent the fifth gear set, the fifth gear set is adjacent the second reverse gear set, the second reverse gear set is adjacent the third gear set, the third gear set is adjacent the fourth gear set, and the fourth gear set is adjacent the first reverse gear set.

12. The manual transmission of claim 9 further comprising an output member connected directly to the countershaft.

13. The manual transmission of claim 12 wherein the output member is a transfer gear in mesh with a differential assembly.

14. A manual transmission comprising:
a transmission housing;
first, second, third, fourth, and fifth gear sets, wherein the first gear set includes a first gear in mesh with a second gear, the second gear set includes a first gear in mesh with a second gear, the third gear set includes a first gear in mesh with a second gear, the fourth gear set includes a first gear in mesh with a second gear, and the fifth gear set includes a first gear in mesh with a second gear;
a first reverse gear set including a first reverse gear in mesh with a second reverse gear;
a second reverse gear set including a first reverse gear in mesh with a second reverse gear;
a transmission input shaft rotatably supported in the transmission housing and wherein each of the first gear of the first, second, third, fourth, fifth gear, and first reverse sets are rotatably fixed directly to the transmission input shaft;
a countershaft rotatably supported within the transmission housing and spaced apart from and parallel with the transmission input shaft, wherein each of the second gear of the first, second, third, fourth, fifth, and second reverse gear sets are selectively engageable with the first countershaft;
a reverse shaft rotatably supported within the transmission housing and spaced apart from and parallel with the transmission input shaft, wherein each of the second gear of the first and the first of the second reverse gear sets are rotatably fixed directly to the reverse shaft;
a first synchronizer assembly for selectively connecting at least one of the second gear of the third gear set and the second gear of the fourth gear set to the countershaft;
a second synchronizer assembly for selectively connecting at least one of the second gear of the fifth gear set and the second gear of the second reverse gear set to the countershaft; and
a third synchronizer assembly for selectively connecting at least one of the second gear of the first gear set and the second gear of the second gear set to the countershaft,
wherein the first gear set is adjacent the second gear set, the second gear set is adjacent the fifth gear set, the fifth gear set is adjacent the second reverse gear set, the second reverse gear set is adjacent the third gear set, the third gear set is adjacent the fourth gear set, and the fourth gear set is adjacent the first reverse gear set, and
wherein the selective engagement of the first, second, and third synchronizer assemblies establishes at least one of five forward speed ratios and one reverse speed ratio.

15. The manual transmission of claim 14 wherein the first gear set provides a first forward speed ratio, the second gear set provides a second forward speed ratio, the third gear set provides a third forward speed ratio, the fourth gear set provides a fourth forward speed ratio, the fifth gear set provides a fifth forward speed ratio, and the first and second reverse gear sets provide a reverse speed ratio.

\* \* \* \* \*